United States Patent [19]
Anttila et al.

[11] 4,014,474
[45] Mar. 29, 1977

[54] METHOD FOR TREATING PARTICULATE MASSES FROM COMPLEX ORES OR ORE PRODUCTS BY FROTH FLOTATION

[75] Inventors: Lars Alrik Anttila, Malmberget; Per Anders Herman Henningsson Fahlström, Akers Runo; Ernst Olov Fägremo, Boliden; Verner Herbert Hedman, Boliden; Sven Göran Åberg, Boliden, all of Sweden

[73] Assignee: Boliden Aktiebolag, Stockholm, Sweden

[22] Filed: Sept. 24, 1973

[21] Appl. No.: 400,146

[30] Foreign Application Priority Data

Sept. 26, 1972 Sweden .................. 12414/72

[52] U.S. Cl. .................. 241/20; 209/9; 209/167
[51] Int. Cl.$^2$ .................. B02C 23/12
[58] Field of Search .......... 423/26; 209/166, 167, 209/9, 1, 3; 241/33, 87, 20, 24; 210/412

[56] References Cited

UNITED STATES PATENTS

| | | | |
|---|---|---|---|
| 870,727 | 11/1907 | Kneuper | 210/412 X |
| 1,036,974 | 7/1927 | Wisen | 209/167 |
| 1,354,604 | 10/1920 | Duggan | 210/412 |
| 1,619,807 | 3/1927 | Blumfield | 241/33 X |
| 1,973,578 | 9/1934 | Ruth | 209/167 |
| 2,048,369 | 7/1936 | Brinker | 209/167 |
| 2,064,031 | 12/1936 | Ralston | 209/166 |
| 2,125,663 | 8/1938 | Wuensch | 241/33 X |
| 2,362,750 | 11/1944 | Hayward | 210/412 UX |
| 2,599,530 | 6/1952 | Hodges | 209/9 X |
| 2,664,199 | 12/1953 | Barker | 209/167 |
| 2,811,255 | 10/1957 | Nokes | 209/167 |
| 2,834,466 | 5/1958 | Hament | 210/87 X |
| 3,067,957 | 12/1962 | Enck | 209/166 X |
| 3,598,327 | 8/1971 | Brandes | 241/33 |
| 3,735,931 | 5/1973 | Weston | 209/3 X |
| 3,759,386 | 9/1973 | Konev | 209/167 |

OTHER PUBLICATIONS

Can. Min & Mett Bulletin, vol. 51, Jan.–June '58, pp. 215–218.

Primary Examiner—Robert Halper
Attorney, Agent, or Firm—Stevens, Davis, Miller & Mosher

[57] ABSTRACT

A flotation concentrate in the form of a water suspension is treated with a reagent that nullifies the effect of previously used collectors. The suspension is filtered, and subjected to a mechanochemical treatment that includes chemical conditioning of the mineral surfaces and producing fresh surfaces by grinding with grinding bodies which additionally provide ions that promote selectivity. Grinding efficiency is controlled by the amount of material fed to the mill. The quantity of pulp flowing to the filter is determined and the supply of collector reagent to the filter and the rotary speed of the mill are regulated in response to the flow values.

7 Claims, 2 Drawing Figures

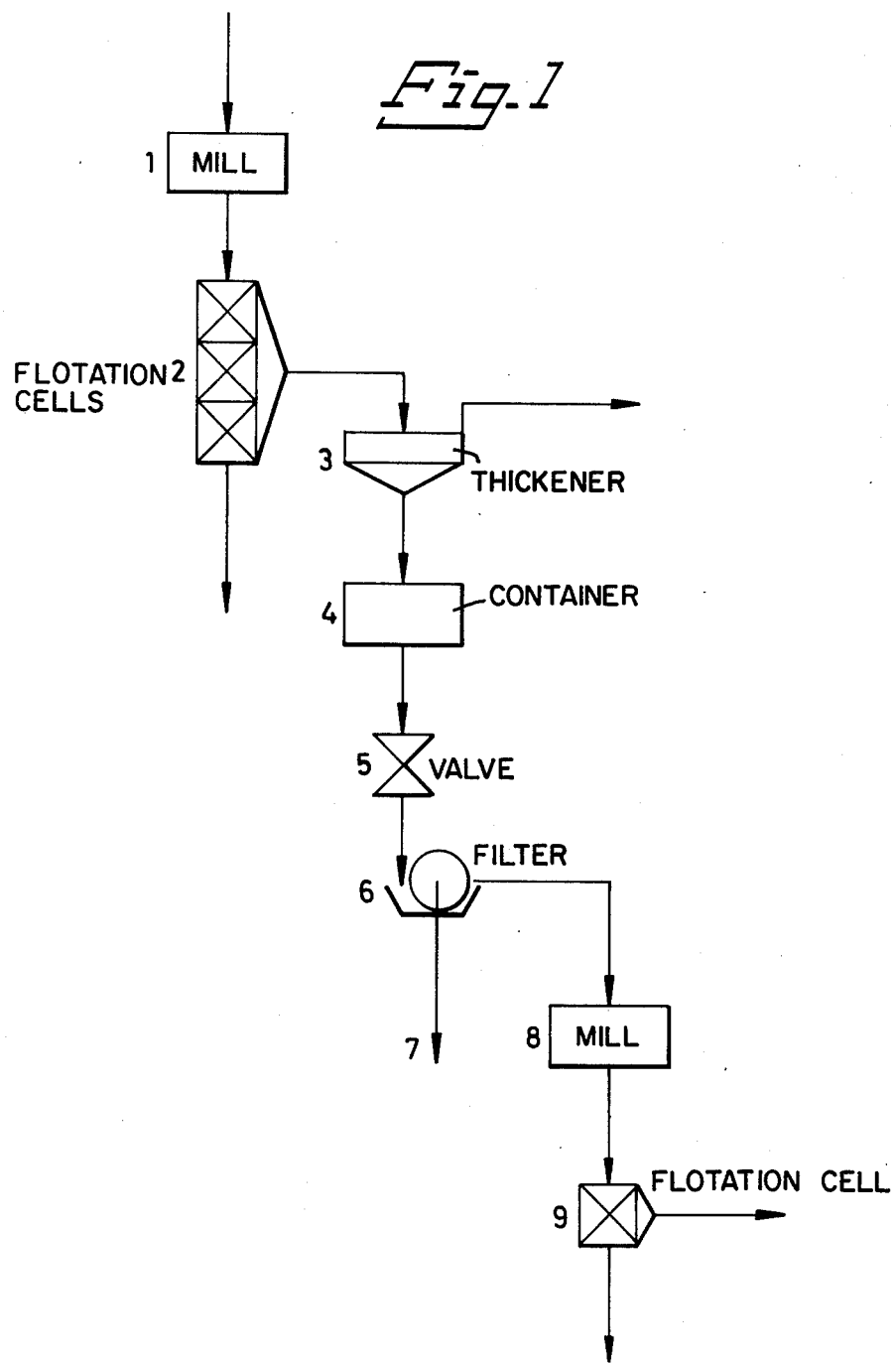

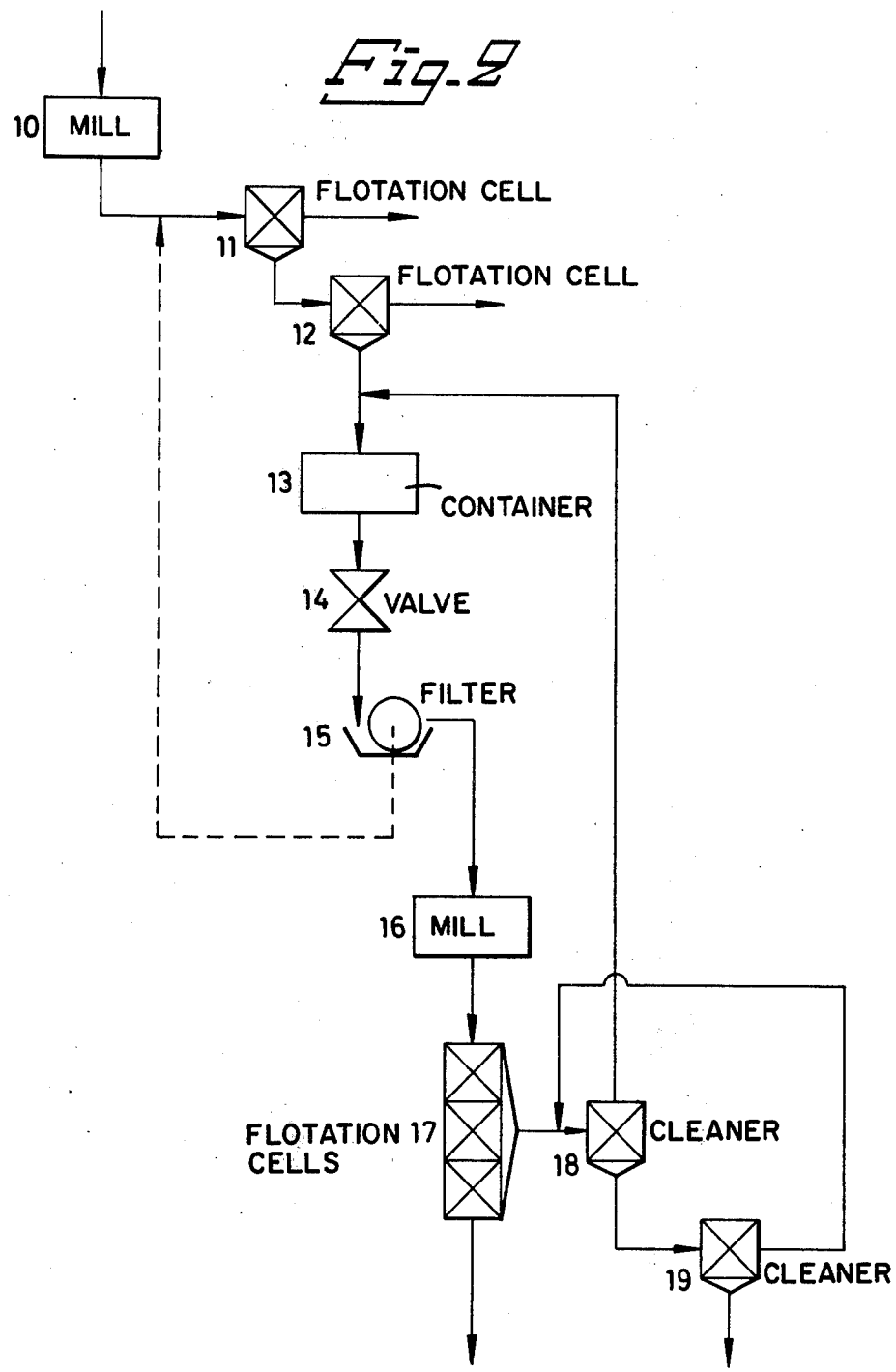

METHOD FOR TREATING PARTICULATE MASSES FROM COMPLEX ORES OR ORE PRODUCTS BY FROTH FLOTATION

The present invention relates to a method for treating particulate masses from complex ores or ore products by froth flotation and apparatus for carrying out the method. The particulate masses are characterized by the fact that they contain two or more valuable minerals, which may comprise, for example, minerals containing the base metals copper, lead, zinc, mercury, arsenic, antimony, bismuth, cadmium, tin, the noble metals gold and silver, iron and its alloying metals, and sulphur and oxygen. Other valuable minerals which can be treated by means of the method according to the present invention include different technical minerals such as apatite, fluorspar and baryte.

The valuable minerals are originally present in crystallized form as fine particles with a greater or smaller degree of coherency in complex ores. In addition to valuable minerals, ore or ore products also contain varying quantities of non-metalli-ferrous gangue minerals such as quartz, silicates and iron carbonates, alkali and earth metals. The most common method used hitherto for recovering valuable minerals from a complex ore is selective flotation. With selective flotation, ore which has been crushed and ground to unlock the mineral particles is brought into the presence of ion-producing collector reagents to selectively render the different minerals hydrophobic, whereafter said minerals are floated off by froth flotation techniques.

When treating sulphide ores, the normal procedure is to float off the minerals in the following sequence: copper pyrites, galenate, zincblende, iron pyrites and arsenopyrites. In certain instances, copper and lead minerals are collectively floated off, whereafter zinc minerals, arsenopyrites and iron pyrites are floated selectively. With iron ores, it is normal to float the minerals in the sequence iron oxide - apatite.

With the selective flotation method, and particularly when treating fine-grained ores, which require excessive grinding to unlock the minerals contained therein, different types of complex concentrates are unintentionally obtained owing to the fact that the techniques employed with the separate flotation step to render the minerals hydrophobic are not efficient enough. A complex concentrate is a concentrate containing two or more valuable minerals. Thus, with the selective flotation of sulphide ores, copper and lead concentrate, for example, obtain a certain content of entrained hydrophobic zinc blende and zinc concentrate a certain content of copper and lead mineral. The amount of metal which accompanies a concentrate unintentionally reduces the content of the desired mineral and consequently increases the costs for treating the concentrate. Further, minerals which are unintentionally floated off are lost, since they cannot normally be recovered.

The problem is similar with, for example, the flotation of iron ores containing apatite. The phosphorous content of the iron concentrate in the form of apatite reduces the value of the concentrate, while iron accompanying an apatite concentrate during a flotation process impurifies the concentrate and reduces its value.

In certain cases complex concentrates comprising two or more minerals are intentionally produced by rendering the minerals hydrophobic collectively, since this technique provides a better result than selective flotation. The following process technique is normally applied when collectively rendering concentrates hydrophobic. The complex collective concentrate is treated in the quantity and water-diluted state obtained thereby during production with a reagent whose function is to nullify and/or modify the hydrophobic properties of the surfaces of the mineral particles by ion reaction. The reagent is normally supplied to the pulp in series-connected mixers, the pulp being thickened in some instances between the mixing steps. With other methods, the reagent is admixed in conjunction with the re-grinding of the complex concentrate. Subsequent to treating the concentrate in this manner, the body of particles is subjected to a selective or renewed collective flotation process for the purpose of separating one or more hydrophylic valuable minerals. It has been found in practise, however, that the aforedescribed method of nullifying or modifying the hydrophobic properties of concentrate particles is not sufficiently effective and in many cases fully insufficient for dividing up the collective concentrate.

The following processes for separating minerals from complex concentrates are examples of those processes with which sufficient selectively cannot be obtained:

1. Suppression of zinc minerals in copper lead concentrates by treating with cyanide.
2. Suppression of zinc minerals in copper lead concentrate or in complex zinc concentrate by treating with sulphide.
3. Suppression of lead mineral in copper lead concentrate by treating with bicromate and/or sulphur dioxide.
4. Suppression of zinc mineral, nickel mineral and iron pyrites in complex copper, zinc and iron pyrites concentrates by treating with acid.
5. Suppression of iron pyrites in cooper-iron pyrites concentrates by treating with $Ca(OH)_2-$ or $NaOH + Ca^{2+}-$.
6. Suppression of iron glance with water glass and/or starch derivatives before the flotation of apatite.

In an attempt to solve the problems associated with poor selectivity, it has been endeavoured to make the reactions more effective by a) greatly prolonging the treatment times, b) strongly agitating the complex concentrates and c) by subjecting them to grinding operations. These measures, however, have not provided the desired result, owing to the fact that it has not been possible to optimally adapt the reactions during the hydrophilizing process, as a result of secondary reactions occurring in the reaction mixture. Consequently, thickeners have been used to reach long treatment times with simultaneous stirring of the pulp.

Despite these attempts, previously known methods for nullifying the hydrophobic properties of the concentrate have been associated with such disadvantages as high consumption of reagent, unsatisfactory selectivity with subsequent flotation processes, highly contaminated effluent water, larger volumetric flows and expensive, complicated and bulky equipment.

It has now been found that these disadvantages can be at least substantially circumvented by the novel method of the present invention for treating complex concentrates or multi-mineral concentrates obtained by flotation.

The concentrates treated in accordance with the invention may have been obtained by one single flotation process or by a series of different flotation processes. In this way, it is possible to produce a purer mineral concentrate than has previously been possible. The first concentrate flotation process may either have been effected previously and at a different locality than that at which the method of the invention is carried out, or may have been effected at a location closely adjacent that to which said method is to be effected.

The invention relates to a method for the flotation of a flotation concentrate containing particles of at least two different minerals capable of being separated by flotation, characterized by adding to the concentrate prior to said further flotation in water suspension a reagent which nullifies in at least part of the material the effect of collectors used in a previous flotation process, while filtering the water suspension to remove reaction products and non-reacted reagent from the concentrate, and to reslurry the remaining concentrate in water and subject the pulp to a mechanochemical treatment step to form new surfaces on the particles in the presence of substances which suppress at least some but not all of the residual material in the subsequent flotation process.

The filtering and grinding steps characteristic of the method according to the invention are effected with an accurately adapted pulp density. At the filtering step the pulp should contain more than 20% by volume, preferably between 23–37% by volume of solid goods, while at the mechanochemical step the pulp should contain more than 23% by volume, preferably 32% by volume of solid goods. The mechanochemical step preferably takes the form of an accurately adapted grinding operation using especially suitable ion generating grinding bodies. With the grinding step the gross energy input is normally between 0.5–5 kWh/tons of solid material in the pulp, preferably between 1–3 kWh/tons solid material.

The invention has been primarily tested on and is intended for use with floated sulphidic complex concentrates containing two or more sulphides of zinc, copper, lead, arsenic, iron, nickel, cobalt, molybdenum, gold, silver, antimony, bismuth and mercury, but can also be applied with other types of floated concentrates, such as concentrates containing iron glance and apatite.

The invention will now be described with reference to the accompanying drawing, in which FIG. 1 is a flow sheet of a method for treating a complex concentrate, and FIG. 2 is a flow sheet of a modified method.

The flow sheet shown in FIG. 1 illustrates a method with which a complex concentrate is treated in accordance with the invention. In preparation for treatment of the concentrate in accordance with the invention, the material, i.e. ore, is passed to means 1 for mechanically breaking down the ore in a known manner. The apparatus suitably comprise crushers and mills. The crushed material is then concentrated in a known manner in a flotation apparatus 2, there being obtained, subsequent to rendering the material hydrophobic with collectors, a flotation concentrate containing at least two valuable minerals slurried in water, which minerals are to be separated at a later stage by means of the method according to the invention. The concentrate is then treated in a thickener 3 until the desired pulp density is obtained. It is preferred, however, to effect the flotation process in a manner such that, subsequent to said process, the pulp density of the concentrate exceeds 20% by volume of solid material, and hence the thickener can be omitted in certain cases. The pulp is then suitably passed to a container 4, in which the composition of the pulp and the rate of flow thereof are equalized. The pulp is passed from the container to a filter 6 by means of a conduit optionally provided with a valve, such as that shown at 5. The filter 6 may be of the horizontal table filter type, as described hereinafter, or a type of filter equivalent thereto. When the concentrate to be treated is obtained from a plant remote from the plant in which it is to be treated in accordance with the invention and is stored prior to such treatment, the crushing and grinding apparatus may suitably be replaced by a wet scrubber, while the flotation apparatus 2 may be replaced by a mixer in which the material is disintegrated and suspended in water. The concentrate is then treated in a thickener 3 and the remaining process is the same as that described above.

The reagent with which the complex concentrate is treated in order to greatly nullify the effect of collectors used in previous flotation steps on at least some of the material present is added in conjunction with the filtering operation. The collector is suitably added to the material in the conduit through which the pulp is passed to the filter 6, in the pulp bath of the filter and/or to the filter surface itself in a manner hereinafter described. The filtrate is removed via a conduit 7. In this way, the average stay time during which the reagent can affect the pulp is short.

It has been surprisingly found that the short average stay time which can be obtained with the method of the present invention affords an important advantage over known techniques. The method of the present invention is suitably effected so that the average time during which the substantial quantity of reagent is in contact with the suspended particles is at most 30 minutes, preferably at most 15 minutes. The stay time is suitably calculated from the time when addition of reagents is terminated to the time when the particles leave the filter apparatus. When the longer treatment time is preferred, a greater or smaller portion of the reagent is charged to the container 4 adjacent the filter. When extremely short reagent treatment times are desired, the reagent is suitably charged directly to the filter surface.

By way of comparison, it can be mentioned that corresponding treatment times applied with known methods are normally frm 10 to 20 times longer than those applied with the method of the present invention.

The filter cake discharged from the filter is admixed with water and reslurried, whereafter the resulting pulp is subjected to a mechanochemical treatment process to form fresh surfaces on the particles in the presence of substances which, when the material is subjected to a further flotation treatment process, suppresses at least the material whose collector activity has been greatly nullified during the filtering process. This is preferably effecting by grinding the material in a mill 8 in a manner hereinafter described.

The change in the surface properties of at least one mineral in the body of particles by means of the aforementioned reagent treatment process and the filtering and grinding operations enables the complex concentrate to be divided up into at least some of its constituents by a further selective flotation process, which is effected in a conventionally constructed flotation circuit 9. The complex concentrate is subjected to a selective flotation process, wherewith one or more minerals are floated off under the influence of remaining or added collectors, while one or more minerals, which have been suppressed by treatment according to the present invention, are removed as non-floated material.

If the floated concentrate is complex and it is desired to separate the different constituents thereof, the method of the present invention can be repeated on the complex concentrate.

Since the pulp being treated has a high density, the filtrate discharged through the conduit 7 contains a relatively high concentration of reaction products and a certain content of non-consumed reagent. It is therefore normally possible to utilize the filtrate in some other process step, integrated with the mineral treatment process, or to recover reagent from the filtrate, which also constitutes an advantage afforded by the present invention.

FIG. 2 illustrates an alternative method with which the filtrate is utilized by recirculation. The figure is a flow sheet showing a suitable method for treating ore containing both sulphidic and oxidic minerals of copper, lead, zinc and other metals.

According to this embodiment, the ore is crushed or ground to suitable particle size in an apparatus 10 and charged in the form of a slurry to one or more flotation steps 11, in which it is subjected to a collective flotation process. The sulphidic and oxidic minerals are made hydrophobic therewith by the combined action of collectors and activating substances capable of forming sulphide ions for example, whereafter the hydrophobic minerals are floated off.

The complex concentrate obtained is purified by subjecting the same to a further flotation process in one or more flotation steps 12, whereafter the pulp, which has a pulp density of more than 20% by volume, is passed to a filter 15 via a flow equalizing container 13 and a regulating valve 14, the pulp being treated with a reagent in accordance with the invention during its passage through the filter.

If the density of the pulp is too low, a thickener can be included in the circuit, to obtain the desired high pulp density. For the purpose of effecting a subsequent selective flotation of metals in sulphidic and oxidic form, it is often suitable to nullify the collector effect by adding sulphide ions. There is obtained with the filtering step a filtrate containing a high content of, inter alia, alkali-sulphide. The filtrate can thus be returned to the primary flotation step 11 as indicated in FIG. 2.

The filter cake obtained during the filtering process is slurried in water and ground in an appropriate mill, such as that shown at 16, in the presence of substances which have a suppressing effect on at least one of the minerals present in the filtrate.

Subsequent to being ground, the pulp is passed to a flotation apparatus including, for example, a raw series 17 and cleansing series 18, 19 wherewith non-floated material is suitably returned from the second cleansing circuit 19 to the first cleansing circuit 18, while non-floated material from the first cleansing circuit 18 is returned to the equalizing container 13 via a thickener.

In certain instances it may be suitable to nullify the collector effect with hydrogen ions (acid), such as for example on zinc minerals, nickel mineral and iron pyrites. The thus obtained acid filtrate is then returned to a collective flotation step, the pulp being admixed in this step with hydrogen ions. The supply of hydrogen ions facilitates collective flotation of zinc mineral, nickel mineral, and iron pyrites and eliminates or partially reduces the addition of hydrogen ions which must be added in other respects to the flotation step.

The aforedescribed embodiments merely represent an example of the enumerable possibilities which the invention affords with respect to the circulation of modifying, pH-controlling and collecting reagents when treating complex concentrates. A basic feature of the method according to the invention, which implies short and well defined treatment times, is that modification of the minerals takes place in conjunction with the filtering step, i.e. the pulp being treated contains a very high percentage of solid material at the same time as the liquid phase is continuously removed. The apparatus required for putting the method of the present invention into effect is considerably simpler than that used with previously known techniques, thereby affording still further advantages over the prior art. Further, it is not necessary to especially control the entrance of air to the desorption apparatus. With previously known techniques, the control of air to the desorption apparatus has often represented a problem, since certain modifying reagents are sensitive to oxidizing environments, which has caused unreasonably high reagent consumption.

The treatment process according to the invention is carried out in accordance with the following schematically illustrated formula $$[MeX] + [D^-] \rightleftarrows [MeD] + [X^-]$$

where MeX represents hydrophobic mineral surfaces, $[D^-]$ represents the concentration of desorbing reagent, MeD represents hydrophilized mineral surfaces and $[X^-]$ represents the concentration of released ions which render th concentrate hydrophobic. The chemical equilibrium can thus be expressed as:

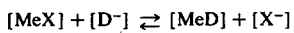

$$k = [X^-]/[D^-]$$

from which it can be seen that by removing $X^-$ during the reaction it is possible to use $D^-$ in smaller concentrations and still obtain equilibrium.

The above equilibrium equation also illustrates a further advantage afforded by the method of the present invention. By working with small quantities of liquid, i.e. a high pulp density, a high concentration of $D^-$ is more readily obtained, which enables the desorption to be made more complete and more rapid and reduces the consumption of reagent.

Since it is possible when applying the method of the present invention to work with concentrated solution and small flows, handling of waste at fluent water is greatly simplified, at the same time as the solutions obtained can be used in other operational steps forming part of the flotation process. By working with small flows and high pulp densities, it is also possible to omit the addition of flocculating agents, which also increases the selectivity during the subsequent flotation process.

Examples of filters which can be used with the present invention are included vacuum drum filters with a run-off filter cloth, box filters, disc filters or horizontal table filters, wherewith the two latter types of filter may be of both the vacuum and pressure type. The use of horizontal table filter divided into sectors enables a plurality of reagent adding steps and optionally washing steps to be made in a practical manner with simple apparatus. In this connection it is often suitable to arrange the sectors in counter-current for the purpose of concentrating the filtrate and reducing the quantity thereof.

A preferred method of carrying out the filtering step can be illustrated as follows. Pulp containing at least 20% by volume of solid material is passed to a horizontal disc filter comprising a rotary liquid permeable plate. An aqueous solution of the reagent is also passed to the filter in conjunction with the feed of pulp thereto. Washing water is supplied, suitably in countercurrent, by successively drawing water from the filter surface and spraying said water on said surface. The filter cake is removed from the filter by means suitable therefore, such as a screw for example. With this arrangement, the time taken for the reaction to take place is relatively short, being of the order of some few minutes, while reaction products can be removed rapidly and completely.

The mineral modification necessary for dividing up the complex concentrate is effected in a mechanochemical treatment step for forming fresh particle surfaces in the presence of substances which suppress at least one, but not all, the materials present during the further flotation step.

The mechanochemical treatment step is intimately connected with the preceding filtration step, and in order to achieve the desired result must be effected under carefully adapted conditions, which are achieved through the preceding reagent and filtering treatment step. The formation of fresh particle surfaces, which is achieved by means of a controlled grinding operation, thus requires the grinding energy supplied to the mill to be controlled so that an optimal effect is obtained. Excessive grinding results in unselective suppression and sludge formation, while insufficient grinding results in only partial suppression of the material to be suppressed.

It is therefore important that all reagents and all reaction products capable by secondary reactions of disturbing the formation of surfaces on the particles during the grinding operation are removed. It is also of great importance that the water balance, i.e. the pulp density, is regulated during the grinding operation, since otherwise it is not possible to control the input grinding energy. With these conditions fulfilled, the filtering step has been found to give a surprisingly good effect.

Since the quantity of concentrate charged to the process is not normally constant, the process should be controlled so that the quantity of reagent added and the grinding power output in the mill can be varied with the quantity of material charged.

This can be effected, for example, by sensing the quantity of material passing to the equalizing vessel, e.g. by arranging adjacent said vessel a smaller vessel which is held filled with said material and provided with weir means. Surplus material can be arranged to be transferred from the weir means to a further vessel having a constant reflow to the equilizing vessel, the level in said further vessel also being sensed. If the level tends to rise, a valve can be regulated in response to the sensed values so that the flow of material is increased, at the same time as the filtering rate, the flow of reagent, the water flow and the grinding effect are controlled with respect to the increasing quantity of material. The sequence of control is reversed when the level in the vessel drops.

The equivalent methods of sensing the flow of material and the construction of the control system are known to those skilled in the art.

When grinding the material in accordance with the invention there are preferably used grinding bodies which produce ions when subjected to wear, said ions by means of a mechanochemical reaction promoting the selectivity in a subsequent flotation step. Examples of such grinding bodies include:

iron balls for generating ferro- and ferric ions with cyanide or $SO_2$ additives for suppressing zinc mineral, zinc balls with cyanide or $SO_2$ additions for suppressing zinc mineral, brass balls or iron pyrite pellets with activation of zinc blende and simultaneous suppression of lead mineral lime stone or dolomite grinding bodies for elevating the pH, bauxite grinding bodies for floc formation, sintered iron oxide grinding bodies for removing surplus sulphides.

To amplify the mechanochemical reaction, which is achieved by means of material worn from the grinding bodies, additives in the form of powdered iron, zinc, brass, iron pyrite, limestone, bauxite and iron oxide may be added in certain cases, these materials acting to further promote the desired reaction.

It has surprisingly been found that substances added to the pulp by wearing away grinding bodies are normally more active than corresponding substances added in the form of solution.

In accordance with the invention, additions of the selectivity promoting wear products from grinding bodies can be readily regulated in relation to the quantity of material treated in the grinding step by controlling the mill power, suitably the rpm of the mill. The mill power is also dependent on the qunatity of material in the mill.

The mill power is preferably maintained at between 1 and 3 kWh gross/ton solid material at a pulp density of more than 23% by volume solid goods.

The methods of the present invention has been found surprisingly adaptable to a number of difficulty resolved flotation problems. This will be illustrated with a number of examples.

EXAMPLE 1

A complex ore containing sulphides of copper, lead, zinc and iron respectively was ground and subjected to a selective flotation process on operational scale. In this way there was first recovered by flotation a copper and a lead concentrate. A zinc concentrate was then recovered by flotation from the products remaining after the copper and lead flotation process. The zinc concentrate was passed to an equalizing container. An aqueous slurry of the zonc concentrate as a pulp density of 20.1 percent by volume was passed from the equalizing container to a drum filter. The aqueous slurry of zinc concentrate was admixed with 3.400 g/tons of sodium sulphide, of which 15% was passed to the equalizing container and 85% to the suspension in conjunction with its discharge from the filter to the equalizing container. The average residence time for treatment of the material with reagent calculated from the time when the material was passed from the equalizing container until it was discharged from the filter ˉ s a filter cake was 29 minutes. Water was sprayed onto the filter cake at the filtering step, since the water phase had previously been removed by suction.

The material treated on the filter was again slurried with water, wherewith there was obtained a suspension having 23.5 percent by volume solid goods. The suspension was treated in a drum will with a continuous through flow of material, the mill power being adjusted so that the quantity of energy supplied thereto was 1.1 kWh/ton of treated material. 3.850 g/ton of sodium hydrogen sulphite were added to the suspension in the mill. The grinding bodies in the mill comprised a mixture of cast iron balls and rich sulphur pyrite ore. Subsequent to the grinding step, the pulp was subjected to a flotation step while adding 31 g/ton of potassium amyl xanthate and 3.850 g/tons of zinc sulphate.

The concentrate to be treated was charged continuously to a slurrying drum, to which water was added. The resulting suspension was thickened, decomposing salts etc. formed during the storage period being removed with the sludge fraction of the thickener. The material was removed from the thickener in the form of a pulp having 29 percent by volume solid goods. The pulp was then passed to an equalizing container from which it was passed to a horizontal disc filter. The

|  | Percent by weight | Content percent | | | Distribution percent | | |
|---|---|---|---|---|---|---|---|
|  |  | Cu | Pb | Zn | Cu | Pb | Zn |
| Floated product | 3.38 | 3.18 | 23.8 | 21.4 | 56.8 | 69.3 | 1.3 |
| Unfloated product | 96.62 | 0.064 | 0.37 | 56.8 | 43.2 | 30.7 | 98.7 |
| Incoming goods | 100.00 | 0.19 | 1.16 | 55.6 | 100.0 | 100.0 | 100.0 |

The example shows how a zinc concentrate can be purified with a practically total yield of zinc while removing therefrom contaminating material, this latter comprising a product enriched in copper and lead suitable for further benefication. The filtrate obtained in the filtering step was used to precipitate out copper ions present in the mine water present together with the treated complex ore. The mine water and the filtrate water were admixed to a pH of 4.5. The copper then precipitated out in the form of sulphide and was removed by filtration. The mine water contained 75 mg/l cooper. Subsequent to removing the precipitated copper sulphide, the copper content of the water was found to have fallen to 0.1 mg/l.

EXAMPLE 2

This example is intended to illustrate the usefulness of the invention when treating a contaminated complex zinc concentration which cannot be disposed of at a satisfactory price.

The zinc concentrate in question had been recovered from a very difficulty enriched ore in a minor enrichment plant having no possibilities of producing a pure concentrate. Subsequent to being produced, the concentrate was subjected to a filtering step, dried and stored on an open supporting surface for approximately 2 months. Since the zinc concentrate obtained, which comprised a substantially portion of the production, could not be disposed of at a full price, the production of the minor plant was not profitable.

The zinc concentrate in question was transported to a larter, central enrichment plant equipped with apparatus by which the method of the present invention could be carried out. The concentrate was treated in these apparatus in the following manner, with the following result.

material was admixed with 5.530 g/ton of sodium sulphide, of which 20% was passed to the equalizing container, 20% to the pulp in conjunction with its discharge from the equalizing container and 60% to the pulp simultaneously as it was charged to the horizontal disc filter. The average residence time for treatment of the material with sodium sulphide calculated from the time it was removed from the filter of a filter cake was 14.5 minutes. The filter cake was sprayed with water in countercurrent during the filtering step.

The material treated on the filter was slurried again with water to a pulp having 32.2% by volume solid goods. The pulp was then treated in a vibration mill with a continuous through flow, the mill power being adjusted so that the amount of energy supplied thereto was 4.9 kWh/ton of treated material. The grinding bodies in the mill comprised a mixture of cast iron balls and cast zinc balls. 4.800 g/tons of sodium hydrogen sulphite and 4.800 g/tons of zinc sulphate were charged to the mill. The pulp was then subjected to a flotation step while stepwise adding 50 g/tons of potassium amyle xanthate and 40 g/tons of foam builder.

A retailable metal raw concentrate was recovered in the form of a floated product and a commerically saleable zinc concentrate as a non-floated product.

|  | Percent by weight | Content % | | | | Distribution % | | | |
|---|---|---|---|---|---|---|---|---|---|
|  |  | Cu | Pb | Zn | Fe | Cu | Pb | Zn | Fe |
| Floated product | 33.3 | 6.07 | 3.68 | 26.4 | 13.9 | 97.5 | 86.0 | 18.3 | 53.6 |
| Unfloated product | 66.7 | 0.077 | 0.30 | 58.9 | 6.0 | 2.5 | 14.0 | 81.7 | 46.4 |
| Incoming material | 100.0 | 2.07 | 1.43 | 48.0 | 8.6 | 100.0 | 100.0 | 100.0 | 100.0 |

By means of the present invention it was possible to work-up the unmarketable zinc concentrate recovered from the minor plant in a rewarding manner, and by co-ordinating the operational steps of the minor enrichment plant with the plant in which the method of the present invention was applied it was possible to raise the production of the minor plant to an economically rewarding level.

EXAMPLE 3

A sample of lead concentrate highly impurified with zinc was treated in a laboratory. The suspension, which was thickened to 25% by volume solid goods, was subjected to a filtering step. 500 g/tons of sodium dichromate in the form of 5% solution was applied to the filter and was allowed to act on the material for two minutes, whereafter the filter cake was washed with water. The filter cake was found to have a solid goods content of 36.9% by volume. The filter cake was slurried in water to 25% by volume solid goods and transferred to a batchwise operating laboratory mill, the grinding bodies of which comprised brass balls and balls of iron pyrites. The pulp was ground at a power rating corresponding to an energy input of 2 kWh/tons of solid goods. Subsequent to the mechanochemical treatment step, the zinc content was floated off by means of 500 g/tons of copper sulphate, 8 g/tons of sodium isopropyl xanthate and 23 g/tons of foam builder. The thus obtained zinc-containing foam product was cleansed in three stages without the addition of further reagents, the following result being obtained.

mill with an energy input of 4 kWh/tons of solid goods. The grinding bodies comprised steel balls, which liberate irons ions, which act to suppress the zinc mineral.

Subsequent to the mechanochemical treatment step, the pulp was subjected to foam flotation in order to isolate the copper mineral. The flotation step was effected with the addition of 82 g/tons of potassium amyl xanthate and collectors, together with 6 g/tons of Pine oil as a form forming reagent. The foam product thus obtained with cleansed in four steps, a finished copper concentrate being obtained. The result is recorded in the product balance below.

| Products | Percent by weight | Content % | | | | Distribution % | | | |
|---|---|---|---|---|---|---|---|---|---|
| | | Cu | Pb | Zn | S | Cu | Pb | Zn | S |
| Floated product | 4.36 | 19.1 | 5.61 | 6.0 | 35.5 | 92.5 | 67.9 | 7.0 | 3.4 |
| Unfloated product | 95.64 | 0.08 | 0.12 | 3.66 | 46.0 | 7.5 | 32.1 | 93.0 | 96.6 |
| Incoming material | 100.0 | 0.90 | 0.36 | 3.76 | 45.5 | 100.0 | 100.0 | 100.0 | 100.0 |

| | Product | Percent by weight | Content % | | Distribution % | |
|---|---|---|---|---|---|---|
| | | | Pb | Zn | Pb | Zn |
| 0 | Incoming material | 100.0 | 59.4 | 9.86 | 100.0 | 100.0 |
| 1 | Unfloated product | 76.2 | 68.0 | 0.34 | 87.3 | 3.0 |
| 2 | Floated product | 23.8 | 31.8 | 36.2 | 12.7 | 97.0 |
| 3 | Unfloated product at re-flotation of 2 | 9.3 | 74.0 | 2.87 | 11.5 | 3.0 |
| 4 | Floated product at re-flotation of 2 | 14.5 | 4.85 | 57.5 | 1.2 | 94.0 |

The example shows that a high-value lead concentrate was obtained by applying the method of the invention, at the same time as the impurified zinc minerals were concentrated with a good yield to form a marketable product.

EXAMPLE 4

A complex ore containing sulphides of copper, lead and zinc and iron respectively was subjected to a grinding step and joint-flotation step on operational scale. In this way there was obtained a concentrate of the aforementioned minerals. The concentrate was thickened to 23% by volume solid goods, whereafter the pulp was acidified with sulphuric acid to pH 3.5. Subsequent to a 10 minutes mixing period, the water phase was filtered off while adding diluted sulphuric acid to the filter cake followed by washing of the cake with water, whereafter the thus obtained filter cake was slurred with water to a solid good content or 24% by volume. The pulp thus obtained was admixed with 3,400 g/tons of slaked time in order to suppress the content of iron pyrites, and was subjected to a grinding step in a ball The example shows with desired clarity the good separation obtained by means of the present invention. The method fully applied with copper and nickel containing pyrrhotite ores, with which subsequent to an acid joint-rotation step, copper and nickel minerals have been separated in an analogous manner with copper and zinc in the described example.

The aforedescribed embodiments of the method according to the invention afford a number of advantages in the treatment of mineral deposits which today are left untouched or which can only be worked at a low economic return, and also in the treatment of concentrates which are today simply stored since they cannot be subjected to enrichment processes for metallurgical and/or environmental reasons.

One of the advantages afforded by the invention and which further improves the result obtained thereby is the possibility of returning expensive reagent, thereby utilizing the same to the full. How this achieved in practise in exemplified in FIG. 2. The washing solutions obtained in concentrated form can be used in the following applications in the manner indicated.

1. Solutions containing sulphide ions:
   when sulphiding oxidic minerals;
   when suppressing zinc minerals;
   when precipitating metals from acid water.
2. solutions containing cyanide:
   when suppressing zinc minerals in a previous process step after acidifying with SO$_2$.
3. solutions containing lime and alkali metal:
   as pH-regulator in a process step suited herebefore;
   when neutralizing acid water;
   when purifying flue gas.
4. acid solutions:
   as pH-regulators in process step suited herefore.
5. metal salt solutions:
   when suppressing and activating minerals in process steps suited herefor.

The claims defining the invention are as follows:

1. A method of treating a flotation concentrate pulp containing at least two different minerals, the minerals having been flotated by means of collector reagents in a previous flotation step and being capable of separation by further flotation, comprising adding to a pulp having a density exceeding 20% by volume of solid material a reagent nullifying the effect of the previous used collectors on at least one of the minerals; using an average stay-time for the particles in contact with the reagent of at most 30 minutes; filtering the pulp so that formed reaction products and unreacted nullifying reagent is removed with the liquid; reslurrying the filtered pulp obtained by means of water; subjecting the pulp obtained to a mechanochemical treatment step comprising chemical conditioning of the surfaces of the mineral particles and grinding whereby fresh surfaces are formed on the mineral particles, controlling the grinding efficiency by the quantity of material supplied during said grinding and floating the pulp in at least one flotation step while suppressing at least one but not all the minerals present by means of suppressing agent addition.

2. A method according to claim 1, wherein the average stay-time is at most 15 minutes.

3. A method according to claim 1, wherein said grinding is effected with an energy input of 0.5–5 kWh/tons of solid material.

4. A method according to claim 1, wherein said mechanochemical treatment step is effected by means of grinding bodies comprising said suppressing reagent material.

5. A method according to claim 1, including recycling the liquid removed by filtering to a preceding treatment step.

6. A method according to claim 1, wherein the pulp density at the filtering step is between 23 and 37% by volume of solid material, and that said pulp density at the mechanochemical treatment step exceeds 23% by volume of solid material.

7. A method according to claim 1, including dewatering the pulp before adding said nullifying reagent.

* * * * *